April 2, 1963  O. DANYLUKE ET AL  3,083,921
DUST PREVENTION DEVICE FOR ROTARY IMPACTOR
Filed May 2, 1961  3 Sheets-Sheet 1

INVENTORS.
Ostap Danyluke &
BY Frank A. Fawcett,

Paul & Paul
ATTORNEYS.

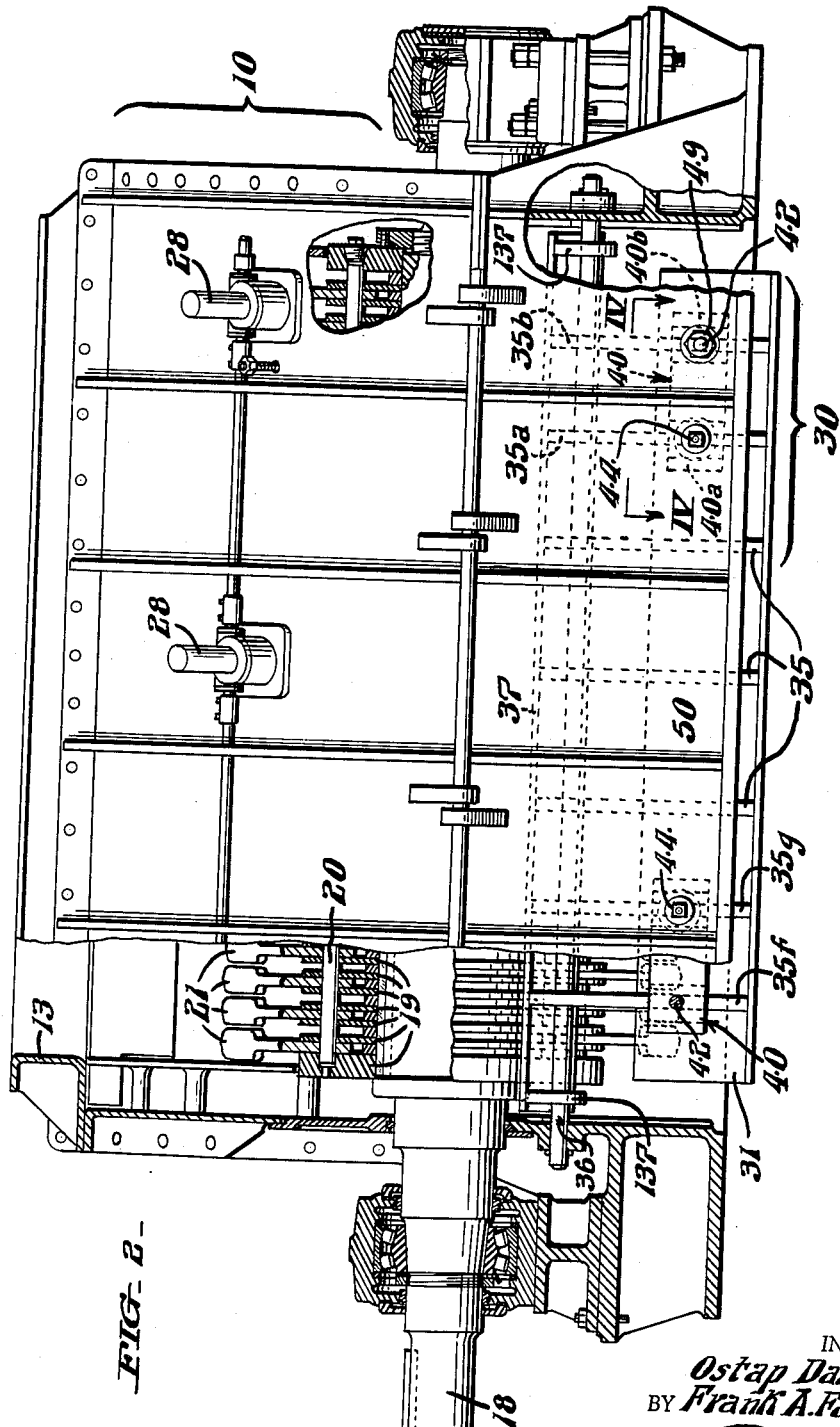

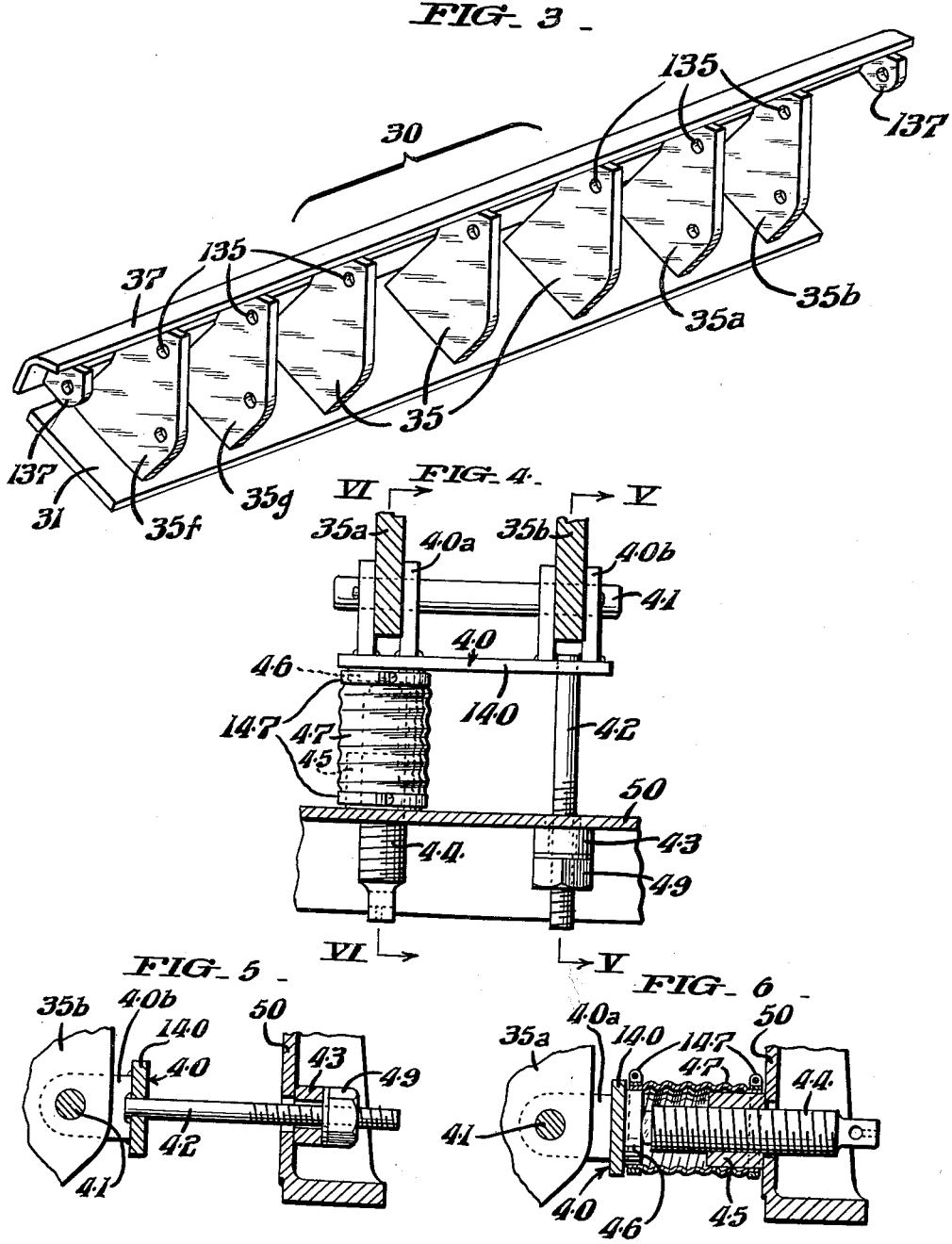

United States Patent Office 3,083,921
Patented Apr. 2, 1963

3,083,921
DUST PREVENTION DEVICE FOR ROTARY
IMPACTOR
Ostap Danyluke, Newton Square, and Frank A. Fawcett, Gladwyne, Pa., assignors to Bath Iron Works Corporation, Bath, Maine, a corporation of Maine
Filed May 2, 1961, Ser. No. 107,158
2 Claims. (Cl. 241—186)

This invention relates to a device for controlling the dust created by a rotor type hammer crusher of the impactor type, as for example, when crushing coal or other materials.

Unless the dust is controlled within the impactor crusher itself, dust is expelled from the discharge chute of the crusher into the open air in large quantities, creating a nuisance. Although the expelled dust could be collected in a separate external dust collection system, it is much more economical to provide means to control the dust within the crusher itself.

Rotor type hammer crushers may be of at least two different types. One type is called a hammermill; another type is called an impactor. This invention is particularly applicable to an impactor type crusher.

In an impactor type of crusher, the coal or other material is reduced in size by double impact. Material dropping down through the feed chute, which is centrally located in the upper part of the impactor crusher, penetrates into the path of rotating beaters or hammers where it is struck by the hammers, is broken, is driven against one of the breaker-block faces where it is further broken. It then rebounds, is again struck by one of the rotating hammers, is again driven against a breaker block face, and again broken. The now crushed material drops out of a delivery exit in the bottom of the impactor through a discharge chute, on to, for example, a moving conveyor belt.

Both the hammermill and the impactor types of crushers have very serious dust problems. To reduce the dust in a hammermill, dust plates have been developed. See, for example, U.S. Patents 2,609,996 and 2,692,088, granted to Layberger on September 9, 1952, and October 19, 1954, respectively. Also see Patent 2,514,111 granted to Wilson on July 14, 1950. All three of these patents are assigned to the assignee of the present application.

The dust plates described in the above patents function very satisfactorily in the hammermill type of crusher. However, in the impactor type of crusher the dust problem has not heretofore been completely solved, and in view of the recent trend toward increased use of the impactor type of crusher, particularly for crushing coking coals, it was important to find means for reducing the dust.

In the absence of dust prevention means such as are provided by our present invention, dust escapes in large quantities through the delivery exit and discharge chute at the bottom of the impactor crusher. When used for crushing coking coal, the dust is very severe and causes an unsanitary and unsatisfactory working condition for the operators. In addition, crushed coal is discharged from the crusher with such force that it packs solidly on the discharge conveyor belt, and tends to stick and be carried around, resulting in a continuous build-up.

In accordance with the present invention, the problem described above is solved by the installation of a dust plate in the lower part of the breaker chamber below the lower end of the breaker block. In a reversible impactor, two dust plates are installed, one on each side of the breaker chamber in corresponding locations. Each dust plate, at least when in use, inclines outward and downward in a generally radial direction relative to the rotor shaft of the impactor. Such dust plate inclines at an angle sufficiently steep to prevent substantial build-up of dust and coal thereon. The clearance between the upper end of the dust plate and the hammer circle is relatively small, but adjustable for best results.

The dust plate, when positioned at the optimum setting for the particular installation, as determined by trial, is believed to cause a negative air pressure at the delivery exit, probably resulting in some suction at the exit rather than "blow-out." With no dust plate, a "blow-out" is experienced which "air conveys" the dust into the atmosphere and great clouds of black dust envelop the discharge zone. With a dust plate at optimum setting, the negative pressure and resulting suction believed to exist at the exit, allows the dust to settle gently on to the discharge conveyor. It is then conveyed away with the crushed product.

In an impactor type of crusher, the static air pressure at the input at the top is inherently negative and no dust problem exists there. But the air pressure at the delivery exit, in the absence of such dust plate as provided by the present invention, is inherently positive. As indicated above, the installation of a dust plate in the position taught by the present invention, is believed to be effective to change the static air pressure at the discharge exit from positive to negative. In any event, with such a dust plate installed, the dust drops out of the delivery exit and discharge chute along with the crushed product, without creating a dust problem.

Our invention will be best understood from a consideration of the following detailed description of a preferred embodiment illustrated in the drawing in which:

FIG. 2 is an end elevational view of the same impactor crusher, also partly broken away and in section;

FIG. 3 is a perspective view of the dust deflector;

FIG. 4 is a view, partly in section, along the line IV—IV of FIG. 2;

FIG. 5 is a view, partly in section, along the line V—V of FIG. 4; and

FIG. 6 is a view, partly in section, along the line VI—VI of FIG. 4.

Figure 1:
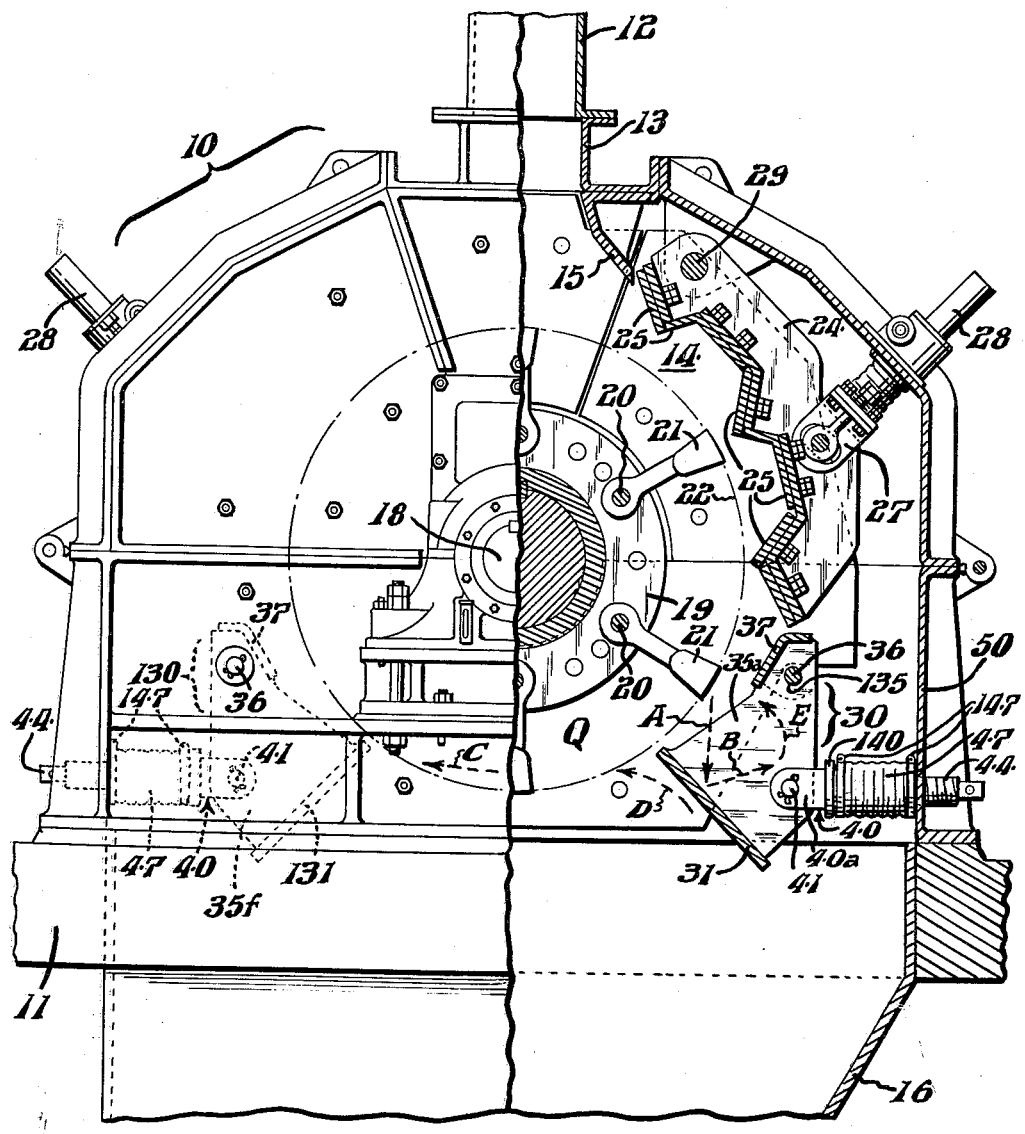
FIG. 1 is a side elevation of an impactor type crusher, partly broken away and in section, showing the dust plates provided by our present invention.

In describing the preferred embodiment of the invention illustrated in the drawing, specific terminology has been resorted to for the sake of clarity. However, it is not the intention to be limited to the specific terms so selected, and it is to be understood that each specific term includes all technical equivalents which operate in a similar manner to accomplish a similar purpose.

Referring now to FIGS. 1 and 2 there is shown a rotary type impactor 10 supported on a base 11 and connected to an upper input or feed chute 12, and to a lower discharge or delivery chute 16. Within impactor 10 is a breaker chamber 14, and mounted within breaker chamber 14 is a rotor shaft 18 having keyed thereto rotor discs 19, to the periphery of which hammer suspension bars 20 and hammers 21 are secured. When the rotor shaft 18 is rotating, the tips of the hammers 21 define a hammer circle 22, shown in dash-and-dot line in the drawing.

Secured to the top of impactor 10 is a hopper 13, and immediately therebeneath are a pair of upper breaker plates 15, one on either side of the chamber 14, only the right-hand one of which is visible in FIG. 1 of the drawing. Below upper breaker plates 15, are a pair of breaker blocks 24, one on either side of chamber 14, only the right-hand one being visible in FIG. 1. The contour of the breaker blocks 24 facing the chamber 14 on either side is such as to form a plurality of breaker faces to which are secured the intermediate and lower breaker plates 25. The right-hand breaker plates 15 and 25 visible in FIG. 1 are the plates which receive the impact of the material being crushed when the rotor shaft is rotating in a clockwise direction (as viewed in FIG. 1). Similar breaker plates similarly mounted in corresponding locations on the other side of breaker chamber 14 receive the impact when the rotor is rotating in the opposite or counter-clockwise direction.

The spacing, particularly between the lower portion of breaker plates 25 and the hammer circle 22, is adjustable as by the clevis means 27 and worm gear jack 28, the breaker block 24 pivoting about shaft 29 as the worm gear jack 28 is adjusted.

In accordance with the present invention, we pivotally and adjustably mount below the lower end of the right-hand breaker block 24 a dust deflector 30 shown in perspective in FIG. 3 and which extends substantially the full width of the crusher. A similar deflector 130, shown in dotted line in FIG. 1, is mounted on the opposite side of chamber 14 below the left-hand breaker block.

As will be seen from the perspective view of FIG. 3, the dust deflector 30 comprises a plate 31 supported by spaced-apart ribs 35 from a curved support plate 37. The deflector 30 is pivotable about a hinge pin 36 (FIG. 1) for the purpose of adjusting the angle of inclination of dust deflector plate 31 and the clearance between the upper edge of the plate 31 and the hammer circle 22. Hinge pin 36 passes through suitably positioned holes 135 in ribs 35 and through ears 137 of support plate 37.

Pivotal adjustment of the dust deflector plate 31 is accomplished from a point outside the frame of the impactor by two sets of adjusting means, one set at each end of the deflector 30. One set of the adjusting means is illustrated in FIGS. 4, 5, and 6.

Referring now to FIGS. 3, 4, 5, and 6, the adjusting means illustrated in FIG. 4 is installed on the two right-most ribs 35a and 35b of the deflector 30 of FIG. 3. A double-clevis member 40 is provided having a left-hand clevis 40a for engaging rib 35a and a right-hand clevis for engaging rib 35b. The clevises 40a and 40b are held in place by a pin 41. Secured, as by welding, to the right end of base plate 140 of double-clevis member 40, as viewed in FIG. 4, is a rod 42 adapted to pass through a hole in the frame 50 of the impactor having thereat a boss 43 welded to the frame. Rod 42 is threaded for receiving a nut 49. The position of the adjustable nut 49 on the rod 42 determines the extent to which the deflector plate 31 may be moved pivotally inward.

As shown in detail in FIG. 6, the left-hand part of the adjusting set comprises a threaded pusher rod or bolt 44 which is adapted to be screwed into a boss nut 45 secured, as by welding, to the inner surface of the side frame 50 of the impactor. A disc-like boss 46 is secured, as by welding, to the surface of the base plate 140 of the double-clevis member 40 oposite the left-hand clevis 40a. A dust cover 47, held in place by hose clamps 147, is used to cover that part of the pusher bolt 44 which is inside of the impactor, thereby to prevent dust and crushed material from getting between the head of bolt 44 and boss 46. It will be seen that by turning bolt 44 in a direction to move its forward end inwardly against the boss 46, the double-clevis member 40, and hence the deflector 30, tends to be moved pivotally inward. However, the extent of the inward movement is limited and determined by the position of the nut 49 on the rod 42. Deflector 30 may be moved pivotally outward by retracting bolt 44 a desired amount and then tightening nut 49 on rod 42.

Adjusting means similar to that just described are also provided at the other end of the deflector 30 of FIG. 3, a double-clevis member corresponding to the one shown in FIG. 4, but reversed in position, being secured to the left-most ribs 35f and 35g.

A similar set of adjusting means is provided on the left-hand side of the impactor for adjusting deflector 130. Corresponding parts have been identified by similar reference numerals.

It will be understood that the adjusting means illustrated in FIGS. 4, 5 and 6, and just described, are but a preferred means for adjusting the pivotal position of the dust deflectors from outside of the impactor, and that other suitable adjusting means may be employed without departing from the invention of the present application.

In operation, the coal or other material to be crushed is dropped into feed chute 12, falls down into breaker chamber 14 and enters the hammer circle 22. Here the material is hit a smashing blow by one of the rapidly rotating hammers 21 and, assuming the machine to be rotating clockwise, the resulting fragments and material are thrown against one of the plates of the right-hand breaker block 24 with such force that the material is further broken by the impact. The larger material rebounds, is hit again by a hammer, is smashed and again thrown against a lower plate of the right-hand breaker block 24 where the impact effects further breakage. This action is repeated until, at the lower end of the breaker block, all of the material has been broken and reduced to desired size. The material then falls through the discharge chute 16 onto, for example, a moving belt conveyor (not shown).

When coal, particularly coking coal, and other materials are reduced by the double impact method of an impactor just described, a considerable quantity of dust is generated which, in the absence of the dust deflector 31 (or deflector plate 131, if the direction of rotation be counter-clockwise) is blown out of the chute 16 by the fan-like action of the rapidly rotating hammers 21. The dust blown out through the discharge chute 16 is, in the absence of prevention means, highly objectionable since it creates a very undesirable and unsanitary working condition for the operators.

We have discovered that the objectionable blow out of dust through the discharge chute 16 may be substantially eliminated by the provision of the adjustable dust deflector plate hereinabove described mounted below the lower end of the effective breaker block and just outside the hammer circle, in substantially the position shown in FIG. 1. In the case of clockwise rotation of rotor shaft 18 and hammers 21, the righthand breaker block 24 is the effective breaker block, and dust deflector plate 31 is effective to prevent the blow out of dust through the chute 16. When the rotor shaft 18 is driven in the opposite or counterclockwise direction, dust deflector plate 131 is the effective plate.

At the feed-in chute 12 of the impactor crusher there is no problem, insofar as dust blow out is concerned, due to the fact that the static air pressure at the inlet is inherently negative during operation of the crusher. It has been determined experimentally that if the static air pressure at the exit chute 16 could also be made negative, the blow out of dust would be prevented. That is to say, there would be no objectionable blow out of dust if the movement of air in exit chute 16 could be kept to a minimum, and if whatever air movement there was, was inward toward the breaker chamber 14. Then the dust would merely settle on the discharge conveyor and be carried away with the crusher discharge.

To achieve such a result, in spite of the fan-like action of the rapidly rotating hammers, seemed a difficult task. We have found, however, that no blowout of dust from exit chute 16 is experienced when a dust deflector plate is placed in substantially the position show in the drawing for plate 31 (or in substantially the position of dust plate 131 for operation in the opposite direction). For each installation, optimum results are obtainable by trial and error by adjusting the pivotal positions of the dust plates for the particular installation. The clearance between the upper edge of the dust plate and the hammer circle may vary from approximately one inch to four or five inches, with the angle of inclination of the dust plates varying in a corresponding manner, the smaller the clearance, the steeper the angle of inclination. The optimum clearance will always be sufficient, however to allow passage of the crushed material while substantially and effectively preventing the blow out of dust.

The optimum angle of inclination of the dust plate 30 will be sufficiently steep to prevent accumulation of dust and material thereon, while effectively so deflecting the air as to create, we believe, a negative air pressure at the discharge exit 16.

While the air flow paths have not been definitely established, it is believed that as the hammers move downward into the lower right-hand quadrant Q of the hammer circle, they drive air down against the deflector plate 31, as indicated in FIG. 1 by the dashed arrow A, and that such air tends to be deflected from plate 31 in the general direction indicated by arrow B. It is further believed that after the hammers pass the deflector plate 31 and move through the last part of quadrant Q, they drive air in the general direction of arrows C and suck air from the underside of the deflector plate 31, as indicated generally by the arrow D. Such suction may also tend to pull the deflected air (arrow B) up and around as indicated generally by the arrow E.

In any event, whatever may be the air-flow paths, we have found that by placing a deflector in the general position shown in FIG. 1, and adjusting it until best results are obtained for the particular machine and installation, the heretofore objectionable blow out of dust is reduced to such extent as not to be objectionable.

While the preferred embodiment of our invention has been described in some detail, it will be obvious to one skilled in the art that various modifications may be made without departing from the invention as hereinafter claimed.

In the claims, the term "impactor type of crusher" means a type of crusher which relies solely on impact to accomplish the crushing, and which has no screen bar cage assemblies. Such an impactor is to be distinguished from a hammermill type of attrition crusher which includes, in addition to breaker blocks, screen bar cage assemblies, and which relies not only on impact but also on sheer and attrition for final sizing.

Having thus described our invention, we claim:

1. In an impactor type of crusher having a housing and an internal breaker chamber; a rotor mounted in said chamber for rotation on a horizontal axis and having hammers secured thereto the tips of which define a hammer circle when said rotor is rotating; a material feed chute in the top of said housing located above the said axis of said rotor for delivering material to be crushed into said chamber and into said hammer circle; a breaker block adjustably mounted in said chamber outside said hammer circle and extending from the upper part of said chamber downwardly along the side thereof to about the level of said rotor axis; and a dust deflector mounted in said chamber immediately below the lower end of said breaker block and outside of said hammer circle, said dust deflector having a plate surface extending substantially the full dimension of said chamber in the direction of said rotor axis and being adjustable independently of said breaker block to present an outward downward inclined deflecting surface in a generally radial plane relative to said hammer circle.

2. Apparatus as claimed in claim 1 characterized in that said dust deflector comprises a horizontally-disposed support plate having secured thereto in dependent position a plurality of vertically-disposed spaced-apart ribs to the lower ends of which is secured a horizontal deflector plate, a hinge pin which passes through holes provided in the upper portion of each rib for pivotally mounting said dust deflector immediately below the lower end of said breaker block, and adjusting means extending from outside the housing of said impactor into said housing and secured to the lower portions of some of said vertical ribs for moving said dust deflector pivotally about said hinge pin to adjust the deflector plate to a position presenting a downward and outward inclined surface in generally radial plane relative to said hammer circle.

References Cited in the file of this patent
UNITED STATES PATENTS

| | | |
|---|---|---|
| 2,411,302 | Stine | Nov. 19, 1946 |
| 2,440,388 | Wright | Apr. 27, 1948 |
| 2,471,068 | Keiper | May 24, 1949 |
| 2,973,909 | Danyluke | Mar. 7, 1961 |

OTHER REFERENCES

Pennsylvania Crusher advertisement, page 62 of Rock Products, 1960.

Mining Engineering, vol 4, issue #6, page 563, Fig. 1, June 1952. Article by W. W. West.